(12) United States Patent
Reisser

(10) Patent No.: US 7,415,962 B2
(45) Date of Patent: Aug. 26, 2008

(54) INTERNAL COMBUSTION ENGINE

(76) Inventor: Heinz-Gustav A. Reisser, 44494 S.R. 541, Coshocton, OH (US) 43812-0655

( * ) Notice: Subject to any disclaimer, the term of this patent is extended or adjusted under 35 U.S.C. 154(b) by 111 days.

(21) Appl. No.: 11/304,608

(22) Filed: Dec. 16, 2005

(65) Prior Publication Data

US 2007/0137613 A1   Jun. 21, 2007

(51) Int. Cl.
*F02B 53/00* (2006.01)
(52) U.S. Cl. ............... 123/245; 123/241; 418/36
(58) Field of Classification Search ........... 123/241, 123/245; 418/35–38
See application file for complete search history.

(56) References Cited

U.S. PATENT DOCUMENTS

| | | | | |
|---|---|---|---|---|
| 1,095,034 A | * | 4/1914 | Sanchez et al. | 418/36 |
| 1,348,675 A | * | 8/1920 | Weed | 418/36 |
| 1,568,053 A | * | 1/1926 | Bullington | 123/202 |
| 2,124,327 A | * | 7/1938 | Wolstenholme | 418/36 |
| 2,413,589 A | * | 12/1946 | Snyder | 418/36 |
| 3,258,618 A | * | 6/1966 | Spier | 310/11 |
| 3,292,602 A | * | 12/1966 | Stewart | 418/38 |
| 3,645,239 A | * | 2/1972 | Cena | 123/245 |
| 3,702,746 A | * | 11/1972 | Parmerlee | 123/18 R |
| 4,072,447 A | * | 2/1978 | Gaspar | 418/36 |
| 4,370,109 A | * | 1/1983 | Sabet et al. | 418/34 |
| 4,738,235 A | * | 4/1988 | Silvoza | 123/245 |
| 6,036,461 A | * | 3/2000 | Bahniuk | 418/35 |
| 6,321,693 B1 | * | 11/2001 | Kim et al. | 418/35 |
| 6,739,307 B2 | * | 5/2004 | Morgado | 123/245 |
| 2005/0016493 A1 | * | 1/2005 | Hoose | 123/245 |

FOREIGN PATENT DOCUMENTS

DE           4209444 A1 * 9/1993

* cited by examiner

*Primary Examiner*—Thomas Denion
*Assistant Examiner*—Mary A Davis
(74) *Attorney, Agent, or Firm*—Brinks Hofer Gilson & Lione

(57) ABSTRACT

An internal-combustion engine comprises an engine housing having a first wall delimiting a first combustion chamber, a first piston also delimiting said first combustion chamber and with a first piston head, a first crankshaft, a second piston also delimiting said first combustion chamber and with a second piston head, a second crankshaft, and a second connecting rod connected between said second piston and said second crankshaft, said first wail defining at least a section of a torus, said pistons being guided along a curved path defined by said section of a torus.

12 Claims, 2 Drawing Sheets

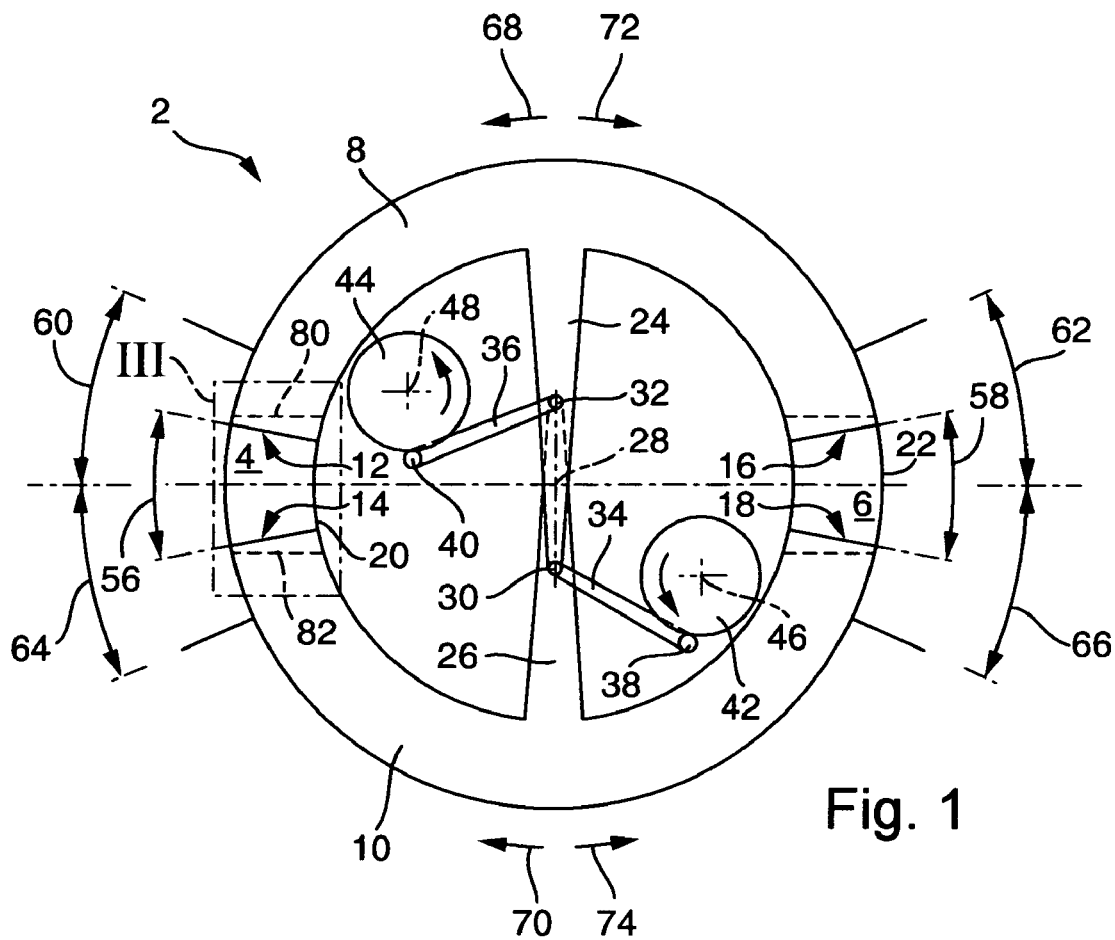
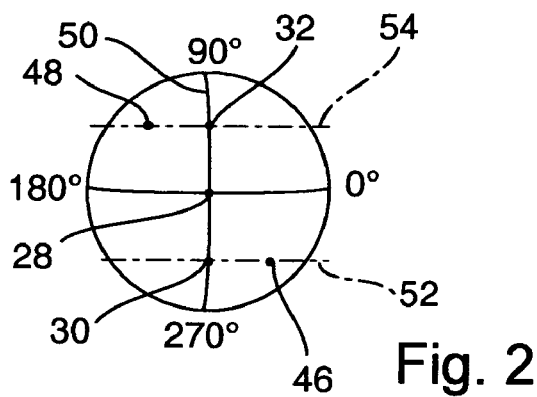

INTERNAL COMBUSTION ENGINE

BACKGROUND OF THE INVENTION

The invention concerns an internal-combustion engine with an engine housing comprising a first wall delimiting a first combustion chamber, with a first piston also delimiting said first combustion chamber by means of a first piston head and with a first crankshaft.

Engines of this type have been known for more than a hundred years and are used as stationary drives as well as for vehicles. In these engines, the walls delimiting the combustion chambers are of cylindrical shape and closed on one side with a cylinder head. On the other side, a piston is moveably guided in the cylinder to transfer the driving force to a crankshaft via a connecting rod as the combustion gases expand. Combustion engines operating according to this principle may function in two cycles or four cycles, such as Otto and diesel engines. The efficiency of these engines is, however, very low.

It is the underlying purpose of the invention to provide a combustion engine having a higher efficiency.

SUMMARY OF THE INVENTION

This object is achieved in accordance with the invention with a combustion engine of the above-mentioned type by providing a second piston also delimiting said first combustion chamber with a second piston head, a second crankshaft, and a second connecting rod connected between said second piston and said second crankshaft, said first wall defining at least a section of a torus and said pistons being guided along a curved path defined by said section of a torus.

In contrast to conventional combustion engines, the inventive combustion engine comprises a combustion chamber which is not only delimited by a wall of the engine housing and a first piston head of a first piston, but also by a second piston head of a second piston. The wall of the engine housing defines at least a section of a torus in which the pistons are guided, so that the pistons travel along a curved path. When the combustion gas is ignited in a combustion chamber that is delimited as described, the two pistons are driven in opposite directions, i.e. forced apart, and transmit their motion to the crankshafts via their connecting rods. The gases expanding in the combustion chamber thereby drive not only one, but two pistons to substantially increase the efficiency of the engine. This reduces fuel consumption and improves emission values.

Since the pistons travel along a curved path, the inventive combustion engine is very compact for a given combustion chamber volume.

Advantageously, the pistons move simultaneously during expansion of the combustion gases, i.e. the forces and moments generated are largely compensated for. Vibrations are thereby almost completely compensated for, such that special devices such as e.g. balancer shafts etc. are not required.

In a preferred embodiment, the first piston comprises a third piston head and the second piston comprises a fourth piston head, wherein the third piston head and the fourth piston head delimit a second combustion chamber. This allows for a very compact arrangement of two combustion chambers. Each piston delimits a first combustion chamber at one end and a second combustion chamber at its other end. Therefore, one stroke decreasing the size of one combustion chamber corresponds to increasing the size of the other combustion chamber and vice versa. Therefore, idle strokes of the pistons can be avoided and corresponding losses due to friction are minimized.

A wall having the shape of a torus can delimit the first and the second combustion chambers. It is also possible for the second combustion chamber to be delimited by a separate, second wall which also defines at least a section of a torus. It is understood that, within the scope of this invention, a torus means a ring-shaped body, which, in profile, can have any shape, e.g. circular, square, rectangular or elliptical.

According to a preferred embodiment of the invention, the combustion chamber can have the shape of a cone. This supports a good fuel-air mixture, thereby enhancing clean and efficient combustion.

Another aspect of the invention proposes that the combustion chambers have indentations extending at least partially along spiral paths. These indentations can be provided by the walls of the engine housing and/or by the piston heads delimiting a combustion chamber. The indentations create a vortex flow of the gases contained in the combustion chamber, so that the ignitable parts of the air-fuel mixture are disposed evenly in the combustion chamber. This facilitates operating the inventive internal combustion engine in a direct injection mode.

The two pistons can pivot around a common pivot axis. This reduces the size of the engine and minimize the number of parts needed to position the pistons. For this embodiment, a fuel injection unit and/or an intake valve and/or an exhaust valve and/or a spark plug are preferably arranged in sections of the wall of the engine housing, these sections being concentric with said pivot axis. In other words, the mentioned parts can be arranged in a direction, which is substantially radial with respect to the pivot axis.

The two combustion chambers and the two interposed pistons are preferably arranged in a symmetrical manner. The first connecting rod is thereby joined to the first piston at a junction comprising a first junction axis, the second connecting rod is joined to the second piston at a second junction comprising a second junction axis, and the first junction axis, the second junction axis and the pivot axis are parallel to each other and aligned in a common plane. In other words, when defining the pivot axis as the origin of a coordinate system, the junction axis is arranged on opposite sides of one axis of that coordinate system.

In order to transfer the motion of the pistons to the crankshafts in an efficient manner, the first crankshaft preferably comprises a first rotary axis, and the second crankshaft comprises a second rotary axis, wherein the first rotary axis and the first junction axis are parallel to each other and aligned within a first plane and the second rotary axis and the second junction axis are parallel to each other and aligned within a second plane, wherein in, midwinter position of said pistons, the first plane and the second plane are perpendicular to the common plane, as defined above.

The inventive combustion engine may be a two-cycle or four-cycle engine, wherein the Otto principle as well as the diesel principle may be used.

In accordance with the invention, the two crankshafts are coupled to a flywheel e.g. via transmission wheels and rotate in the same direction. The crankshafts may also be coupled to the flywheel using chains or toothed belts.

When the first crankshaft and the second crankshaft rotate in a same direction, the coupling to a flywheel is very easy, since it can be directly interposed between the two crankshafts.

Further advantages, features and details of the invention can be extracted from the dependent claims and the following description, which describes in detail a particularly preferred embodiment with reference to the drawing. The features shown in the drawing and mentioned in the claims and in the description may be essential to the invention either individually or in arbitrary combination.

BRIEF DESCRIPTION OF THE DRAWING

FIG. 1 shows a schematic top view (or side view) of a combustion engine according to the invention;

FIG. 2 shows a diagram indicating various angles;

DESCRIPTION OF THE PREFERRED EMBODIMENT

Figure 3:
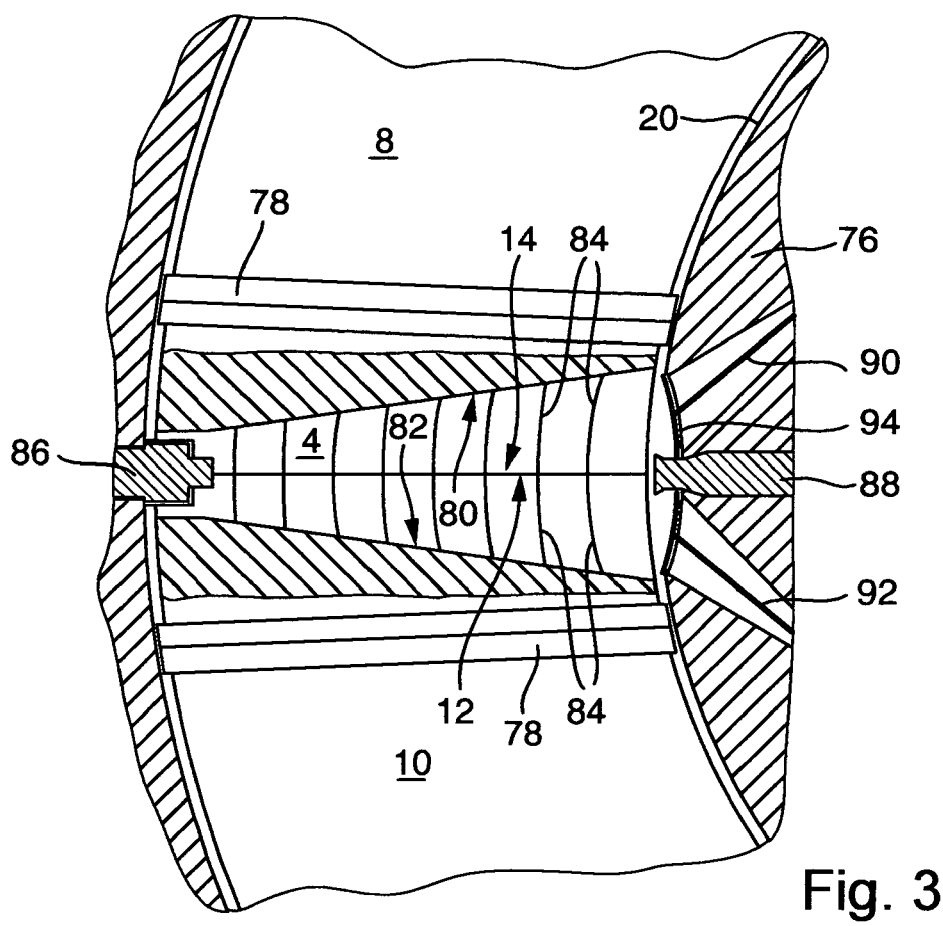
FIG. 3 shows an enlarged view of the region III in accordance with FIG. 1.

FIG. 1 shows the main parts of an inventive internal combustion engine 2. This engine comprises two combustion chambers, a first combustion chamber 4 and a second combustion chamber 6. A first piston 8 and a second piston 10 delimit each combustion chamber. The pistons 8 and 10 have a torus shape and each comprises two piston heads. The first piston 8 comprises a first piston head 12 and the second piston 10 comprises a second piston head 14, which is arranged opposite to the first piston head 12.

At its other end, the first piston 8 comprises a third piston head 16, which is arranged opposite to a fourth piston head 18, provided on the second piston 10.

The first combustion chamber 4 is not only delimited by the piston heads 12 and 14, but also by a first wall 20, which is provided by an engine housing (shown in greater detail in FIG. 3). The second combustion chamber 6 is accordingly delimited by a second wall 22. The walls 20 and 22 have the shape of a section of a torus, the ends of these sections guiding the ends of the pistons 8 and 10 on which the piston heads 12 to 18 are provided.

The piston 8 has a pivot arm 24, which extends in a radial direction towards the center of the engine 2. The piston 10 has a corresponding pivot arm 26. The pivot arms 24 and 26 pivot around a common pivot axis 28. The pivot axis 28 extends in a direction, which is perpendicular to the plane of the drawing. The axis 28 is also shown in FIG. 2 as the origin of a coordinate system.

An end of the pivot arm 24 carries a junction with a junction axis 30 to connect a first connection rod 34 and the piston 8. The pivot arm 26 extends in a plane behind the pivot arm 24 and is, therefore, partially shown in dashed lines. An end of the second junction axis 32 connects the second connecting rod 36 with the piston 10.

The connecting rods 34 and 36 are connected via respective bearings 38 and 40, to a first crankshaft 42 and a second crankshaft 44, respectively. The first crankshaft 42 rotates around a first rotary axis 46, the second crankshaft 44 rotates around a second rotary axis 48.

In FIG. 1, pistons 8 and 10 are shown in their mid-center positions. For these positions, the arrangement of the pivot axis 28, the junction axis 30 and 32 and the rotary axis 46 and 48 are shown in FIG. 2. All axes shown are parallel to each other and extend in a direction, which is perpendicular to the plane of the drawing.

The pivot axis 28 and the junction axes 30 and 32 lie in a common plane 50. The distance between the pivot axis 28 and the first junction axis 30 is the same as the distance between the pivot axis 28 and the second junction axis 32.

The first junction axis 30 and the first rotary axis 46 are arranged in a plane 52, which is perpendicular to the common plane 50. Accordingly, the second junction axis 32 and the second rotary axis 48 lie in a common plane 54, which is also perpendicular to the common plane 50. The distance between the axes 30 and 46 and the distance between axes 32 and 48 are the same. These distances can be the same as the distances between axes 28 and 30 and/or between axes 28 and 32.

With further reference to FIG. 1, in which pistons 8 and 10 are shown in their mid-center positions, the piston heads 12 and 14 are spaced apart from each other by an angle 56, which has the same value as an angle 58 corresponding to the second combustion chamber 6 between the piston heads 16 and 18.

When the first piston head 12 travels between its top dead center position and its bottom dead centre position, it travels along the angle 60. Accordingly, the third piston head 16, also belonging to piston 8, will travel along the angle 62, which is equal to angle 60. The piston heads 14 and 18 of piston 10 will also travel along angles 64 and 66. For the embodiment shown, the size of all angles 56 to 66 is the same.

When piston 8 moves according to a direction indicated with reference numeral 68, the piston head 12 moves from its bottom dead center position to its top dead center position. Accordingly, the piston head 14 moves in direction 70 from its bottom dead center position to its top dead center position. Alter both pistons 8 and 10 have reached their top dead center positions with respect to the first combustion chamber 4, the pistons 8 and 10 will move along respective directions 72 and 74, so that, with respect to the second combustion chamber 6, the piston heads 16 and 18 will move from their bottom dead center positions to their top dead center positions. The pistons 8, 10 therefore move in opposite directions.

In FIG. 3, pistons 8 and 10 are shown in their top dead center positions with respect to combustion chamber 4. FIG. 3 also shows parts of an engine housing 76, in which a wall 20 is provided, which has the shape of a section of a torus in which the torus-shaped pistons 8 and 10 are guided along a circular path.

Figure 4:
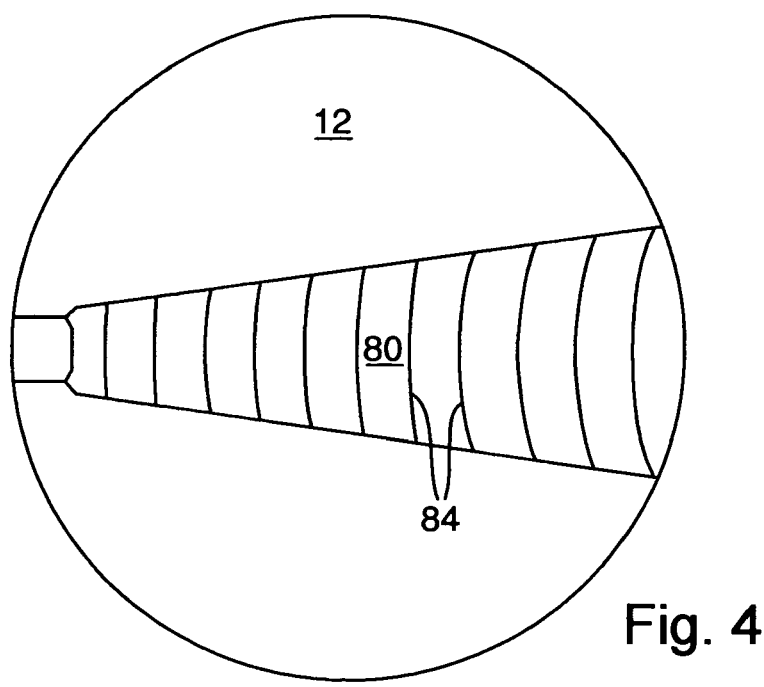
FIG. 4 shows a front view of a piston head.

The pistons 8 and 10 can be at least partially hollow or be made from a lightweight material, such as carbon composites. Adjacent to their respective piston heads 12 and 14, the pistons 8 and 10 carry piston rings 78, which seal the pistons 8 to 10 with respect to the wall 20 of the engine housing 76. The piston heads 12 and 14 define a combustion chamber 4, which has the shape of a cone. The piston head 12 of piston 8 comprises a cone wall 80, which is also shown as a dashed line in FIG. 1 and in a front view in FIG. 4. Accordingly, the piston head 14 of piston 10 has a cone wall 82. The cone walls 80 and 82 have indentations, which extend at least partially along a spiral path. These indentations 84 are also shown in FIG. 4. The indentations 84 initiate a vortex flow within the combustion chamber 4, so that a clean and efficient combustion can take place.

A fuel injector 86 is provided at the tip of the cone-shaped combustion chamber 4 and mounted within the engine housing 76. A spark plug 88 is accommodated in the engine housing 76 on the side opposite to the fuel injector 86. A double spark ignition system can also be provided.

An intake valve 90 and an exhaust valve 92 are provided adjacent to the spark plug 88. The valves are integrated in a rounded bottom plate 94, which merges with the wall 20.

Lobes provided on the crankshafts 42 and 44 can drive the valves 90 and 92. They can also be electromagnetically operated, which allows for a more flexible valve timing.

The engine can be operated according to the four-cycle-principle. When operating the inventive engine according to the two-cycle-principle, use of a forced air induction system is recommended. This system comprises an air compressor, an air storage tank and an intercooler. The compressor forces fresh air through the intercooler and into the air storage tank. When the air storage tank has reached its maximum capacity, pressure, and volume, a valve switches an air-return from the air storage tank to the air compressor. This causes the air to resume circulation through the intercooler system.

I claim:

1. An internal-combustion engine, the engine comprising:
   an engine housing having a first wall delimiting a first combustion chamber and defining at least a section of a torus;
   a first piston having:
   a first piston head also delimiting said first combustion chamber; and
   a first piston pivot arm;
   a first crankshaft;
   a first connecting rod connected between a first junction axis of said first piston pivot arm and said first crankshaft;
   a second piston having:
   a second piston head also delimiting said first combustion chamber; and
   a second piston pivot arm;
   a second crankshaft; and
   a second connecting rod connected between a second junction axis of said second piston pivot arm and said second crankshaft, wherein said first and said second pistons are guided along a curved path defined by a common axis of rotation and said first and second junction axis, wherein said first and said second pistons move in opposite directions, and the first piston pivot arm and the second piston pivot arm rotate about the common axis.

2. The combustion engine of claim 1, wherein said first and said second pistons move simultaneously.

3. The combustion engine of claim 1, wherein said first piston further comprises a third piston head and said second piston further comprises a fourth piston head, wherein said third piston head and said fourth piston head delimit a second combustion chamber.

4. The combustion engine of claim 2, wherein said second combustion chamber is delimited by said first wall.

5. The combustion engine of claim 3, wherein said second combustion chamber is delimited by a second wall, said second wall defining at least a section of a torus.

6. The combustion engine of claim 1, wherein said first combustion chamber is cone shaped.

7. The combustion engine of claim 1, wherein said first combustion chamber has indentations extending at least partially along spiral paths.

8. The combustion engine of claim 1, further comprising at least one of an intake valve, an exhaust valve, and a spark plug disposed in sections of said first wall, said sections being concentric with said pivot axis.

9. The combustion engine of claim 8, wherein said first junction axis, said second junction axis, and said pivot axis each being parallel to each other when aligned in a common plane.

10. The combustion engine of claim 9, wherein said first crankshaft comprises a first rotary axis and said second crankshaft comprises a second rotary axis, wherein said first rotary axis and said first junction axis are parallel to each other and aligned within a first plane, said second rotary axis and said second junction axis being parallel to each other and aligned within a second plane, wherein in a mid-center position of said first and said second pistons, said first plane and said second plane are perpendicular to said common plane.

11. The combustion engine of claim 1, wherein the engine is one of a two-cycle engine, a four-cycle engine, an Otto engine and a diesel engine.

12. The combustion engine according to claim 3, wherein an angle between the piston heads on the same piston is 120 degrees.

* * * * *